No. 813,396. PATENTED FEB. 27, 1906.
S. C. ANKER-HOLTH.
FRICTION CLUTCH.
APPLICATION FILED NOV. 1, 1905.
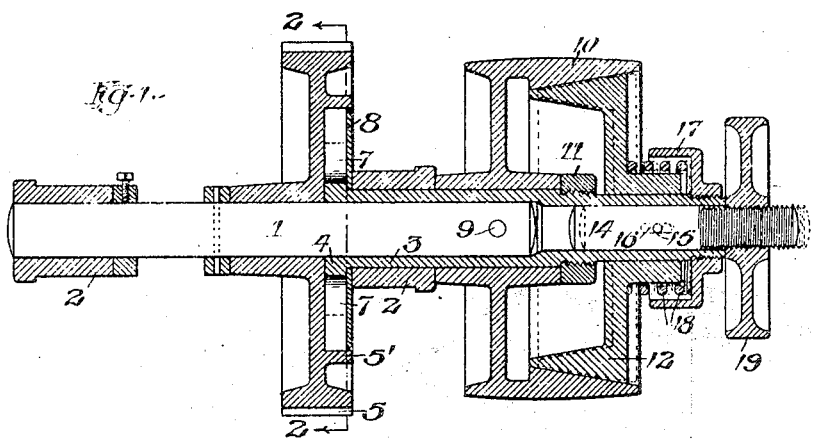
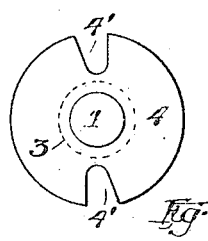
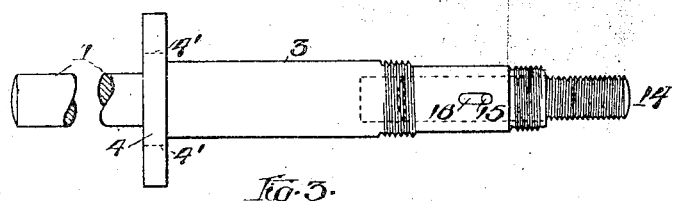
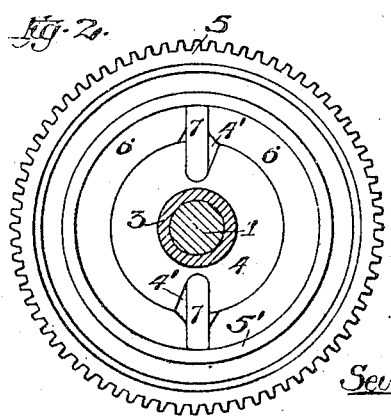
Witnesses:
F. W. Hoffmeister
T. A. Alfreds
Inventor:
Severin C. Anker-Holth
By J. C. Names
Attorney.

UNITED STATES PATENT OFFICE.

SEVERIN C. ANKER-HOLTH, OF RIVERSIDE, ILLINOIS.

FRICTION-CLUTCH.

No. 813,396.     Specification of Letters Patent.     Patented Feb. 27, 1906.

Application filed November 1, 1905. Serial No. 285,876.

*To all whom it may concern:*

Be it known that I, SEVERIN C. ANKER-HOLTH, a citizen of the United States, residing at Riverside, in the county of Cook and State of Illinois, have invented a new and useful Improvement in Friction-Clutches, of which the following is a complete specification.

While this invention relates, broadly, to friction-clutches, it is more expressly designed for use on the driving-shaft of power-driven cream-separators. When used in this connection, it is desirable not only to start the bowl gradually, but also to permit it to stop gradually and yet allow the clutch mechanism to be brought to a more abrupt stop, which is necessary in order to disengage same.

It is the object of the present invention to effect such results, thereby facilitating the starting and stopping of the bowl of cream-separators or other like devices.

Referring to the accompanying drawings, Figure 1 represents a longitudinal section of the clutch mechanism, the shaft and rod being shown in side elevation. Fig. 2 is a transverse section of the friction-ratchet, the view being taken as indicated by the line 2 2 in Fig. 1. Fig. 3 illustrates a modified construction in which the shaft and sleeve constitute a single piece, and Fig. 4 is an end view of same.

In the drawings, 1 designates the shaft mounted in suitable bearings, as 2 2, and 3 is a sleeve fixed to said shaft and having its outwardly-projecting end somewhat reduced in diameter. The inner end of the sleeve 3 terminates in the flange 4, which is provided with the oppositely-disposed notches 4'. At the end of said sleeve 3 adjacent to flange 4 thereon is journaled loosely on the shaft 1 the driving-gear 5, and formed preferably integral with said driving-gear is the ratchet-casing 5'. In the casing 5' are fitted the friction half-rings 6 6, which are arranged at a point coincident with the notched flange 4 of the sleeve 3. The notches 4' in the said flange receive the pawl-levers 7, the notches being so formed that the pawl-levers actuate the friction-rings in only one direction and the washer 8 retains the pawl-levers in position.

For a more specific description of the construction and operation of the foregoing parts reference is made to an application filed by me March 8, 1905, Serial No. 249,019, "Friction-clutch," in which claim is made to the construction set forth therein.

The sleeve 3 is shown as being secured to the shaft 1 by the pin 9 and are, in effect, as one piece; but such securement is not essential, as the shaft and sleeve might be made independently rotatable and not impair their functions. Furthermore, the sleeve might be made as one piece with the shaft, as indicated by the modified construction shown in Fig. 3. On the inner end of the sleeve 3 loosely journals the driving-pulley 10. Longitudinal movement of this pulley is prevented by means of the flange 4 on the sleeve 3, the bearing 2, and the collar 11, which is threaded on said sleeve. The flange of the pulley 10 is extended to form the exterior conical friction-surface of the clutch, the interior surface thereof being formed by the friction cone or clutch member 12, which is also sleeved but rotatively fixed upon the reduced outer end of the sleeve 3. To effect the necessary longitudinal movement of the cone 12 in engaging and disengaging same in relation to its coöperating member 10, a rod 14, having a threaded end, is placed within the bore of the sleeve 3, and a pin 15 connects said rod with the hub of said cone, the oppositely-disposed slots 16 in the sleeve permitting of longitudinal movement of the rod 14 and cone 12 relative to their supporting-sleeve, which remains longitudinally fixed. A cup-shaped collar 17 is threaded on the outer end of the sleeve 3, and a helical spring 18 is interposed between said collar and the cone 12, the normal tendency of this spring being to hold the two clutch members into engagement with each other. It is apparent that longitudinal movement of the rod 14 will effect a corresponding longitudinal movement of the clutch member 12, and it is also apparent that the spring 18, in addition to forcing the clutch member 12 into engagement with its coöperating member, will also tend to push the rod 14 farther into the bore of the sleeve 3. A hand-wheel 19 engages the threaded end of the rod 14 and enables the operator to control the clutch by producing longitudinal movement of the said rod and cone 12. When the clutch members are disengaged, the cone 12 and rod 14 occupy the positions indicated by dotted lines in Fig. 1, the pressure of the spring 18 in this position being taken up by the hub of the hand-wheel 19, bearing against the end of the sleeve. It is to be understood that continuous motion is imparted to the pulley 10 by means of a belt (not shown) leading to any suitable source of power.

To engage the clutch members, the hand-wheel 19 is rotated in a direction which will permit the spring 18 to force the cone 12 into engagement with the other members, the direction of rotation of the said hand-wheel corresponding with the forward rotation of the clutch. To disengage the clutch members, assuming them to be in motion, the hand-wheel 19 is gripped and its further rotation prevented. This will draw the rod 14 outwardly and with it the cone 12, thus disengaging it from the exterior clutch member 10. In consequence of the high rate of rotation of the shaft 1 and the inertia of the driven parts the gripping and holding of the hand-wheel 19 would ordinarily result in a considerable wrench of the operator's hand, an excessive jamming of the said wheel on the rod 14, and also a jamming of the pin 15 in the slots 16. To overcome this difficulty, the friction-ratchet before described has been interposed between the driving-gear 5 and the friction-clutch. By having the ratchet, preferably the friction-ratchet shown, placed closely adjacent to the clutch the separator-bowl or other driven parts, with all the interposed driving connection between it and the shaft, as well as the driving member of the clutch, can continue to rotate, and no injurious shock or jamming will be experienced in overcoming the slight inertia of the shaft 1 with the light members secured thereto.

What I claim as my invention, and desire to secure by Letters Patent, is—

1. In a device of the class described, in combination, a shaft, a friction-clutch mounted thereon, said clutch comprising a loosely-sleeved driving member, a member rotatively fixed to said driving-shaft but longitudinally movable thereon, and means rotatively fixed to said latter member for engaging and disengaging the two clutch members, a driving-gear loosely sleeved upon said shaft, and a ratchet connection between said gear and friction-clutch, as and for the purpose specified.

2. In a device of the class described, in combination, a shaft, a sleeve fixed to the end of said shaft and projecting outwardly therefrom, a friction-clutch mounted on said sleeve, said clutch comprising a member loosely journaled upon said sleeve, a member rotatively fixed to said sleeve but longitudinally movable thereon, and means rotatively fixed to said latter member for engaging and disengaging the two clutch members, a driving-gear loosely sleeved upon said shaft, and a friction-ratchet connection between said gear and clutch, substantially as and for the purpose specified.

3. In a device of the class described, in combination, a shaft, a sleeve provided with oppositely-disposed slots fixed to the end of said shaft and projecting outwardly therefrom, a friction-clutch mounted on said sleeve, said clutch comprising a member loosely journaled upon said sleeve, a member rotatively fixed to said sleeve but longitudinally movable thereon, and clutch-controlling means consisting of a rod having its outer end threaded and fitted within the bore of said sleeve, a pin engaging said rod, the hub of the longitudinally-movable clutch member and also the slots in said sleeve, a collar threaded to the end of the sleeve, a coil-spring interposed between said collar and the longitudinally-movable clutch member, and a hand-wheel mounted on the projecting end of said rod, a driving-gear loosely sleeved upon said shaft, and a friction-ratchet connection between said gear and friction-clutch, substantially as and for the purpose specified.

SEVERIN C. ANKER-HOLTH.

Witnesses:
MARGARET A. SWEENEY,
J. C. WARNES.